United States Patent
Chang et al.

(10) Patent No.: US 10,175,820 B2
(45) Date of Patent: Jan. 8, 2019

(54) VERIFICATION APPARATUS AND VERIFICATION METHOD FOR TOUCH DISPLAY PANEL

(71) Applicant: CHUNGHWA PICTURE TUBES, LTD., Taoyuan (TW)

(72) Inventors: Shao-Lun Chang, New Taipei (TW); Chang-Sheng Weng, New Taipei (TW); Chi-Liang Kuo, Taoyuan (TW); Wen-Chuan Wang, New Taipei (TW)

(73) Assignee: CHUNGHWA PICTURE TUBES, LTD., Taoyuan (TW)

( * ) Notice: Subject to any disclaimer, the term of this patent is extended or adjusted under 35 U.S.C. 154(b) by 442 days.

(21) Appl. No.: 15/080,540

(22) Filed: Mar. 24, 2016

(65) Prior Publication Data
US 2017/0192606 A1  Jul. 6, 2017

(30) Foreign Application Priority Data
Jan. 4, 2016  (CN) .......................... 2016 1 0004021

(51) Int. Cl.
*G06F 3/041* (2006.01)
(52) U.S. Cl.
CPC .................. *G06F 3/0418* (2013.01)
(58) Field of Classification Search
CPC ........... G06F 3/0418; G06F 11/36; G06F 1/04

USPC .................................. 324/500, 750.01–750.3
See application file for complete search history.

(56) References Cited

U.S. PATENT DOCUMENTS

| 2005/0057487 | A1* | 3/2005 | Takata | G09G 5/003 345/102 |
| 2012/0147664 | A1* | 6/2012 | Rho | G11C 11/1673 365/158 |
| 2014/0375344 | A1 | 12/2014 | Wang et al. | |

FOREIGN PATENT DOCUMENTS

TW  I365318  6/2012

* cited by examiner

*Primary Examiner* — Melissa J Koval
*Assistant Examiner* — Trung Q. Nguyen
(74) *Attorney, Agent, or Firm* — CKC & Partner Co., Ltd.

(57) ABSTRACT

A verification apparatus and a verification method are suitable for a touch display panel which comprises multiple partitions. The verification apparatus includes signal generating circuit and verification switch circuit. The signal generating circuit is configured to generate a verification voltage. The verification switch circuit comprises multiple switch units which are separately coupled to the partitions and the signal generating circuit, and are configured to deliver verification voltage simultaneously to at least two of multiple partitions.

4 Claims, 13 Drawing Sheets

VERIFICATION APPARATUS AND VERIFICATION METHOD FOR TOUCH DISPLAY PANEL

This application claims priority to Chinese Application Serial Number 201610004021.X, filed Jan. 4, 2016, the disclosures of which are incorporated herein by reference in their entireties.

BACKGROUND

Field of Invention

The present disclosure relates to a verification apparatus and a verification method. More particularly, the present disclosure relates to a verification apparatus and a verification method for verifying qualities of touch display panels.

Description of Related Art

In a general process of manufacturing a display panel, one verification procedure is required to light up the display panel, so as to check the equality of the display panel. Currently, a usual verification approach for display panel includes connecting a common mode voltage signal (Vcom) to testing probes of the display panel and utilizing the Vcom signal to light up the display panel. However, aforesaid verification approach is not suitable for latest models of touch display panels.

SUMMARY

The disclosure provides a verification apparatus and a verification method for verification of touch display panels.

It is to be understood that both the foregoing general description and the following detailed description are by examples, and are intended to provide further explanation of the disclosure as claimed.

According to an embodiment of this disclosure, a verification apparatus suitable for touch display panel is proposed. The touch display panel includes multiple divided partitions. The verification apparatus includes signal generating circuit and verification switch circuit. The signal generating circuit is used to generate verification voltage. The verification switch circuit is used to simultaneously send the verification voltage to at least two of the multiple divided partitions, and includes multiple switch units which are coupled to divided partitions and signal generating circuit.

A verification method suitable for touch display panel is proposed according to another embodiment of this disclosure. The verification method includes simultaneously sending verification voltage to at least two of multiple divided partitions, light-emitting separately at least two divided partitions according to verification voltage, and judging whether the divided partition functions normally according to the light-emitting condition of the divided partition.

With the verification apparatus, verifications toward touch display panel can be conducted to light up the divided partitions, and to find whether adjacent divided partitions are short-connected or not.

BRIEF DESCRIPTION OF THE DRAWINGS

The disclosure can be more fully understood by reading the following detailed description of the embodiment, with reference made to the accompanying drawings as follows:

FIG. 4A to FIG. 7A and FIG. 4B to FIG. 7B are diagrams of verification apparatus according to different embodiments of the disclosure.

DETAILED DESCRIPTION

Figure 1:
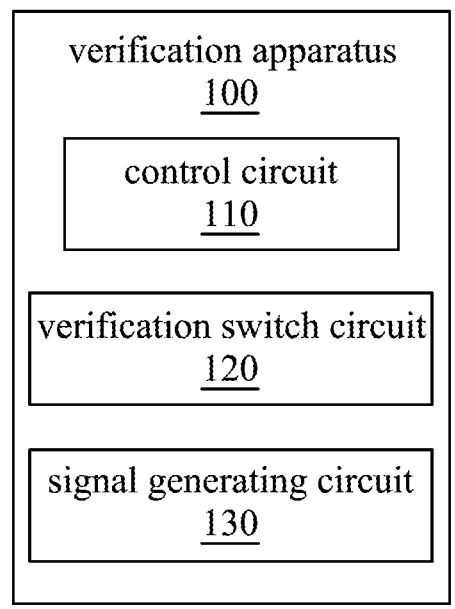
FIG. 1 is a block diagram of a verification apparatus according to one embodiment of the disclosure.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Reference is made to FIG. 1, which is a block diagram of a verification apparatus 100 suitable for touch display panel according to one embodiment of the disclosure. The verification apparatus 100 includes control circuit 110, verification switch circuit 120, and signal generating circuit 130. The verification switch circuit 120 includes switch units (not shown in the figure). The signal generating circuit 130 is configured to generate verification voltage. The control circuit 110 is configured to adjust switch units for triggering the verification switch circuit 120. The verification switch circuit 120 is triggered to send a verification voltage to divided partitions of touch display panel.

Figure 2:
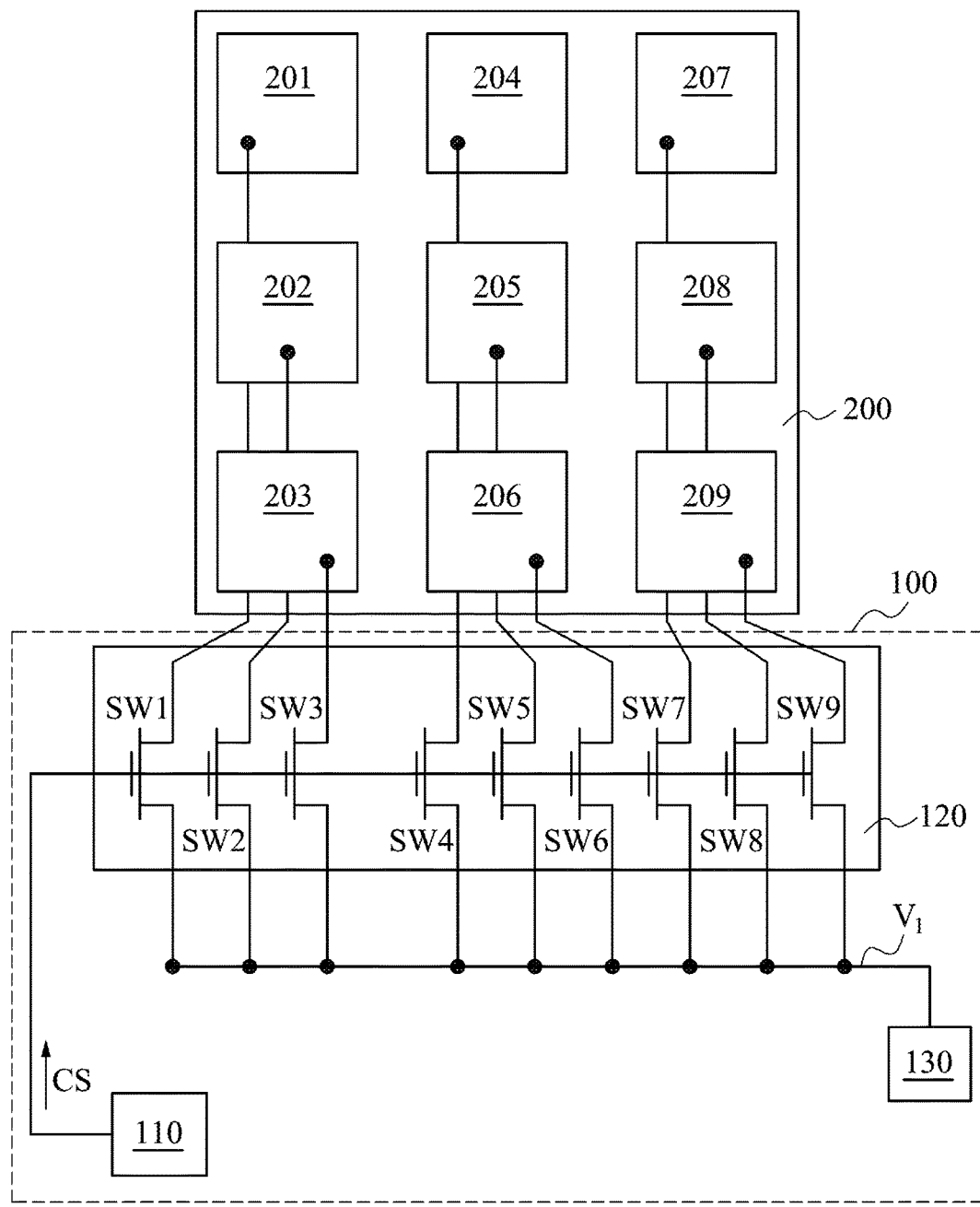
FIG. 2 is a schematic diagram of a verification apparatus according to one embodiment of the disclosure.

Reference is made to FIG. 2, which is a schematic chart of a verification apparatus 100 suitable for touch display panel 200 according to one embodiment of the disclosure. The touch display panel 200 includes divided partitions 201~209, which are separated from each others by non-conductive gaps. That is, the divided partitions 201~209 are not directly electrically connected to each others. The above mentioned divided partitions 201~209 serve as an explanatory example, and the disclosure is not limited to the divided partitions 201~209 shown in FIG. 2. In other embodiments, the touch display panel 200 may include more or less divided partitions.

Each of the divided partitions 201~209 are different parts of the touch display panel 200. In practices, various driving signals are required to control touch function and display function on a large-scale panel. Controlling the whole large-scale panel with one singular driving circuit leads to higher costs for implementing the powerful driving circuit, and also causes difference between response times on different rows/columns of pixels. In practical applications, the touch display panel 200 is often separated into multiple smaller divided partitions 201~209, such that each divided partitions 201~209 will be easier to drive and control. Every single divided partitions 201~209 is connected to corresponding control circuit (not shown in the figure).

Each switch unit SW1~SW9 in the verification switch circuit 120 is respectively connected to one corresponding divided partition. As shown in FIG. 2, the verification switch circuit 120 includes the switch units SW1~SW9. The switch unit SW1 is connected to divided partition 201. The switch unit SW2 is connected to divided partition 202. Likewise, the switch units SW3~SW9 are connected to divided partitions 203~209 respectively.

On the other hand, the switch units SW1~SW9 of the verification switch circuit 120 are coupled to the signal generating circuit 130 on the other side. According to the control signal CS from the control circuit 110, the verification switch circuit 120 sends verification voltage V1 to the divided partitions 201~209. Switch units SW1~SW9 are manipulated according to the logic level of control signal CS.

Figure 3A:
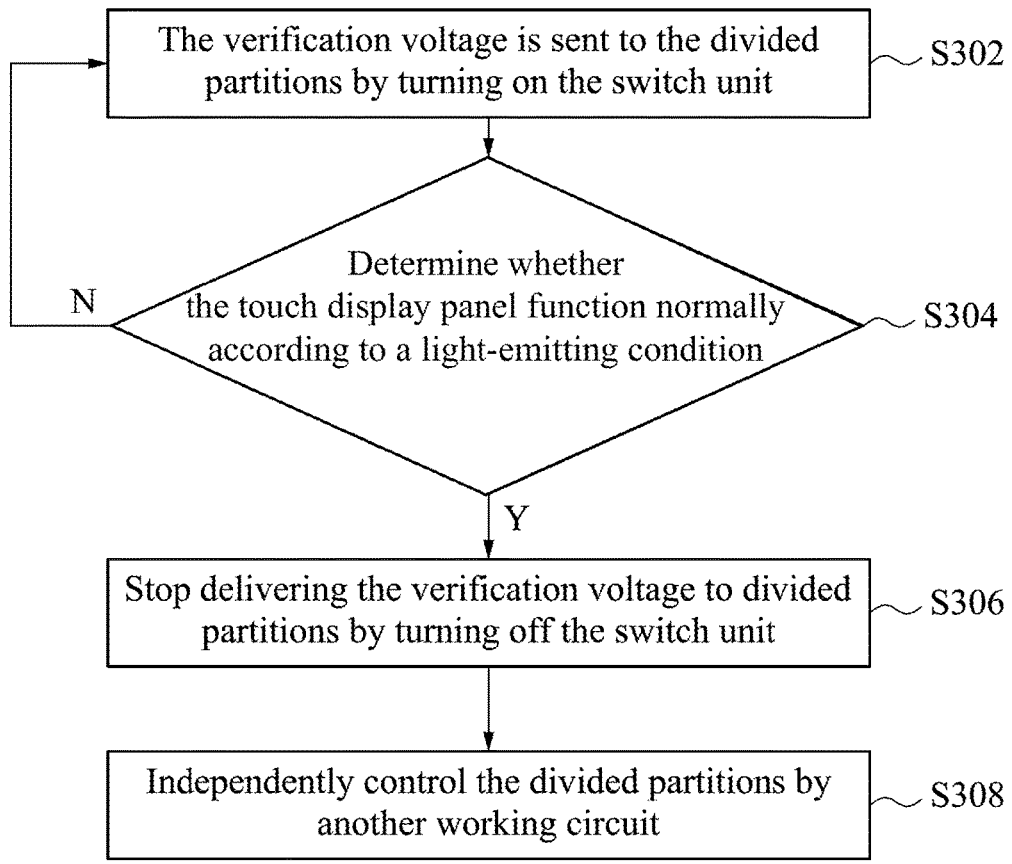
FIG. 3A is a flow chart of a verification method according to one embodiment of the disclosure.

Reference is made to FIG. 3A, which is a flow chart illustrating a verification method 300 suitable for touch display panel 200 according to one embodiment of the disclosure. In step S302, the control signal CS generated by the control circuit 110 is adjusted to high-logic level. The switch units SW1~SW9 in the verification switch circuit 120 is turned on and the verification voltage is sent from the signal generating circuit 130 to every divided partitions of touch display panel 200. Based on the structure shown in FIG. 1, when the control signal CS generated by the control circuit 110 is provided at high-logic level, the switch units SW1~SW9 are turned on. The verification voltage V1 generated by the signal generating circuit 130 is send through the switch units SW1~SW9 to the divided partitions 201~209 divided partitions 201~209 receive the detection voltage V1 correctly. If the divided partitions 201~209 receive the detection voltage V1 correctly, the divided partitions 201~209 will be driven and lit up by the detection voltage V1. In aforesaid example, the verification voltage V1 serves as driving voltage or source voltage for every divided partitions 201~209.

Step S304, as shown in FIG. 1, is performed to determine whether the touch display panel 200 is able to function normally according to a light-emitting condition of the touch display panel 200. If the light-emitting condition indicates that touch display panel 200 is able to function normally, the method 300 performs step S306 for adjusting the control signal CS generated by the control circuit 110 to low-logic level, such that the verification apparatus 100 will stop sending the verification voltage V1 to the divided partition 201~209 of touch display panel 200. The verification ends now and the divided partitions 201~209 will be controlled by another working circuit in the following step S308.

For instance, aforesaid working circuit includes a gate driving circuit (for displaying function), a data driving circuit, and a touch sensing circuit (for touch-sensing function). The gate driving circuit is configured to control transistor switches in divided partitions of the panel. When the transistor switches is on, data driving circuit sends the data that control gray scale and brightness to pixel capacitors in divided partitions of the panel. As mentioned above, since the control signal CS has been adjusted to low-logic level, the switch units SW1~SW9 are turned off, and the verification apparatus 100 stop sending the verification voltage V1 to touch display panel 200, so as to terminates the verification. The verification apparatus 100 is separated from the whole touch display panel, and the verification apparatus 100 will no longer conduct any verification to the touch display panel 200. The signal wirings connected to each divided partition will be used to send signals required by the working circuit, such as the gate driving circuit, the data driving circuit, and/or the touch sensing circuit.

Figure 3B:
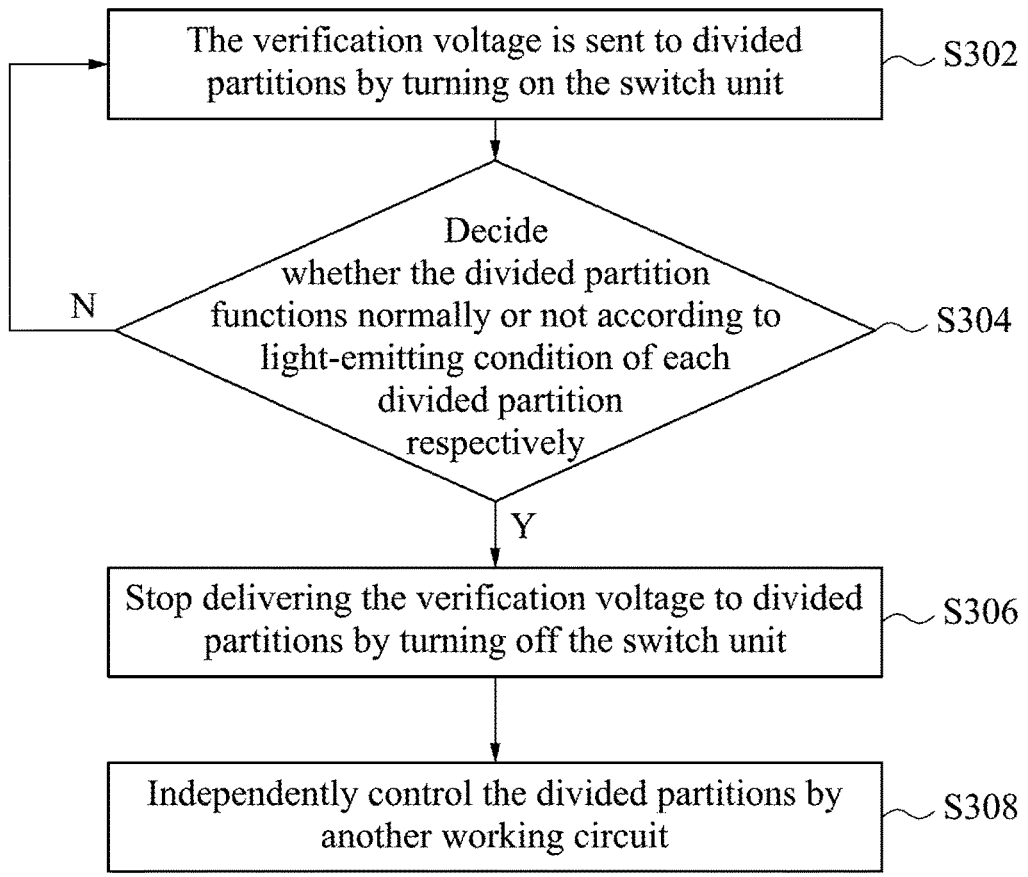
FIG. 3B is a flow chart of a verification method according to another embodiment of the disclosure.

Reference is made to FIG. 3B for another instance. FIG. 3 is a flow chart of a verification method 301 suitable for the touch display panel 200 according to one embodiment of the disclosure. Comparing to the step S304 of verification method 300 shown in FIG. 3A, the verification method 301 shown in FIG. 3B gives a further example about how to decide whether the touch display panel 200 is able to function normally or not. In the embodiment shown in FIG. 3B, step S304 determines whether the divided partitions 201~209 is able to function normally according to light emitting conditions of each divided partitions 201~209. For example, step S304 is configured to decide whether the divided partitions 201~209 are lit or not. If the divided partitions 201~209 are lit up, then the divided partitions 201~209 are regarded as functioning normally. If the divided partitions 201~209 are not lit, then the divided partitions 201~209 regards to be mal-functioned.

After the function is confirmed to be normal, in step S306, the control signal CS generated by the control circuit 110 is adjusted to low-logic level. Meanwhile, the switch units SW1~SW9 in the verification switch circuit 120 is turned off, and the signal generating circuit 130 stop sending the verification voltage V1 to the divided partitions 201~209 of the touch display panel 200.

In other words, at the moment there is no signal transmission between the verification apparatus 100 and the divided partitions 201~209 of the touch display panel 200. In the following step S308, the working circuit (not shown in the figure) will replace the verification apparatus 100. The working circuit controls the divided partitions 201~209 of the touch display panel 200. For example, the input and output interface of the working circuit can be connected to signal circuits of the divided partitions 201~209.

In some embodiments, after the verification is finished, the signal wirings of each divided partitions 201~209 remain electrical connected to the verification apparatus 100, but the switch units SW1~SW9 in the verification switch circuit 120 will be turned off. Therefore, the signal generating circuit 130 will not affect the signal wirings of each divided partitions 201~209. In some other embodiments, after the verification is finished, the electrical connections between the verification apparatus 100 and the signal circuits of each divided partitions 201~209 are removed/interrupted by laser cutting.

Figure 3C:
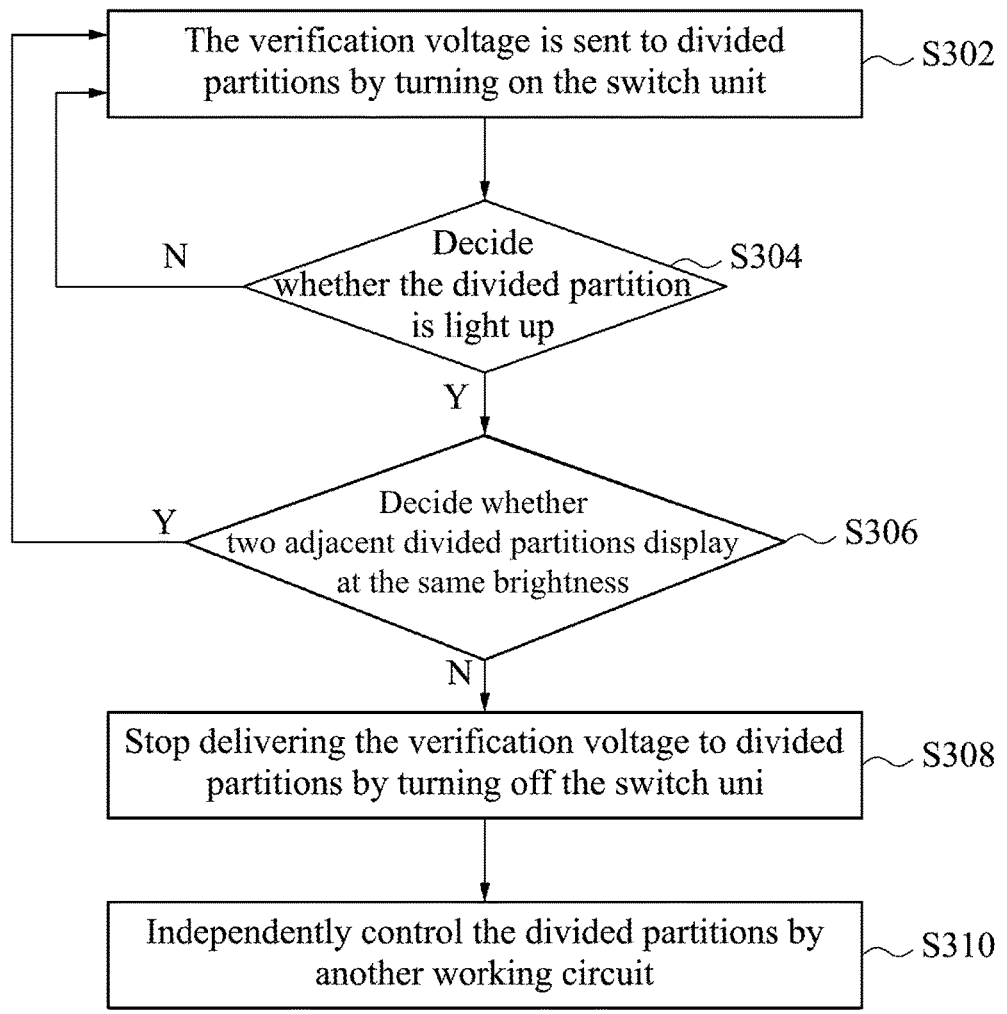
FIG. 3C is a flow chart of a verification method according to still another embodiment of the disclosure.

Reference is made to FIG. 3C, which is a flow chart of a verification method 302 suitable for touch display panel according to still another embodiment of the disclosure. Comparing the verification method 302 shown in FIG. 3C and the verification method 301 shown in FIG. 3B, the flow of decision in the verification method 302 based on the light-emitting condition of divided partitions includes step S304 and S306. Step S304 is executed for deciding whether the divided partition is lit. Step S306 is further executed for deciding whether two adjacent divided partitions display at the same brightness.

In the embodiment shown in FIG. 2, the same verification voltage V1 is provided to two adjacent divided partitions. Even if the two adjacent divided partitions are lit, it still cannot be confirmed whether two adjacent divided partitions are short-connected or not.

To detect whether adjacent divided partitions or the signal wirings thereof are short-connected, different verification voltages are provided to the two adjacent divided partitions in some embodiments. If two adjacent divided partitions receive different verification voltages and display at different brightness, the two adjacent divided partitions are regarded as functioning normally. Two adjacent divided partitions suppose to receive different verification voltages by default and display at different brightness. However, when the divided partitions are short-connected, the divided partitions will receives the same verification voltage and display at the same brightness.

For instance, reference is made to FIG. 4A to FIG. 7A and FIG. 4B to FIG. 7B, which are diagrams of verification apparatus 100 suitable for touch display panel 200 according to different embodiments of the disclosure.

Figure 4A:
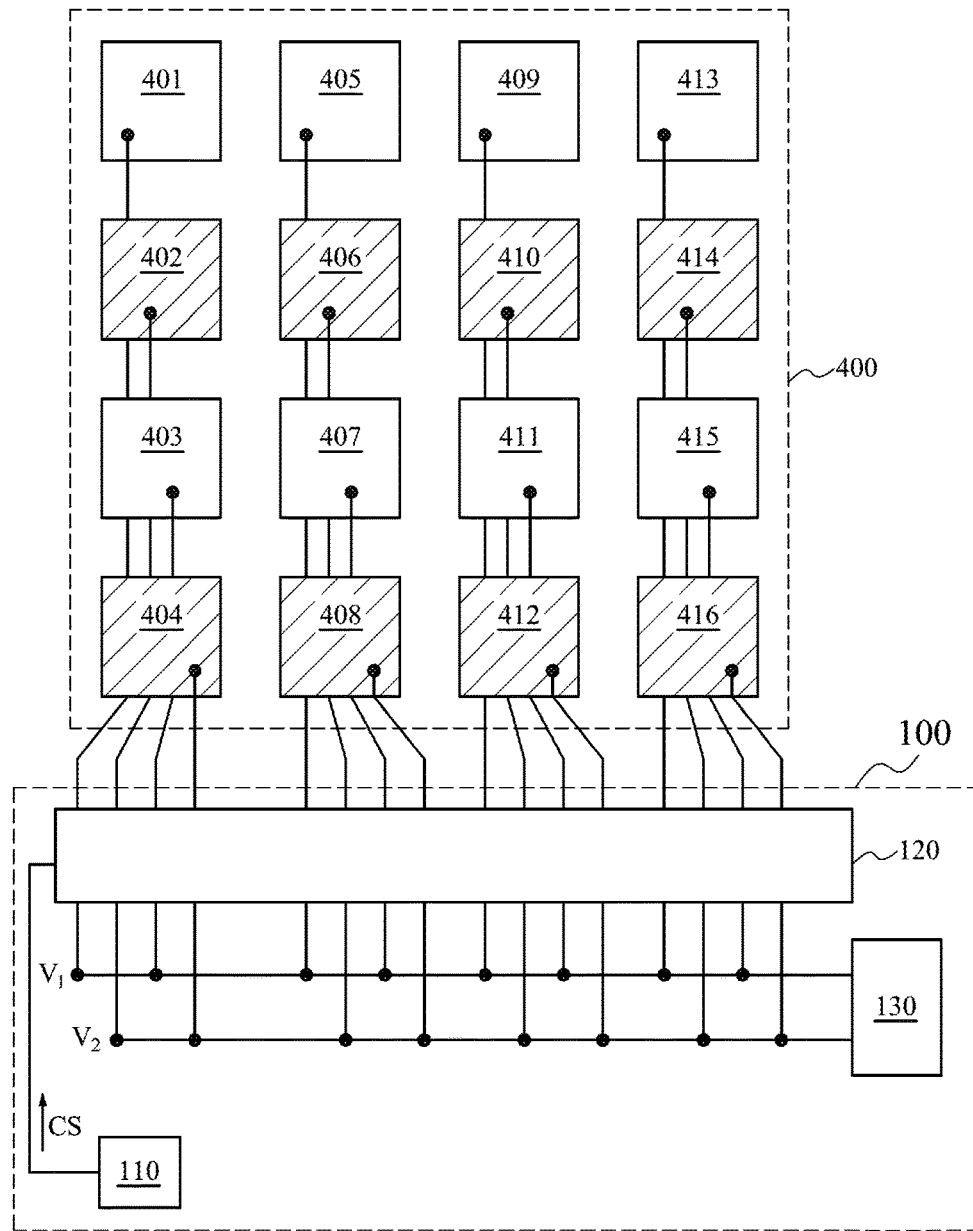

As shown in FIG. 4A, a touch display panel 400 includes divided partitions 401~416. Divided partitions 401, 403, 405, 407, 409, 411, 413, 415 are arranged on odd rows of the touch display panel 400, and divided partitions 402, 404, 406, 408, 410, 412, 414, 416 are arranged on even rows of the 400.

When the signal generating circuit 130 simultaneously sends the verification voltages V1 and V2 respectively to the divided partitions on the odd and even rows. The brightness of the divided partitions on the odd rows are the same, and the brightness of the divided partitions on the even rows are also the same but different from that of the odd rows.

Figure 4B:
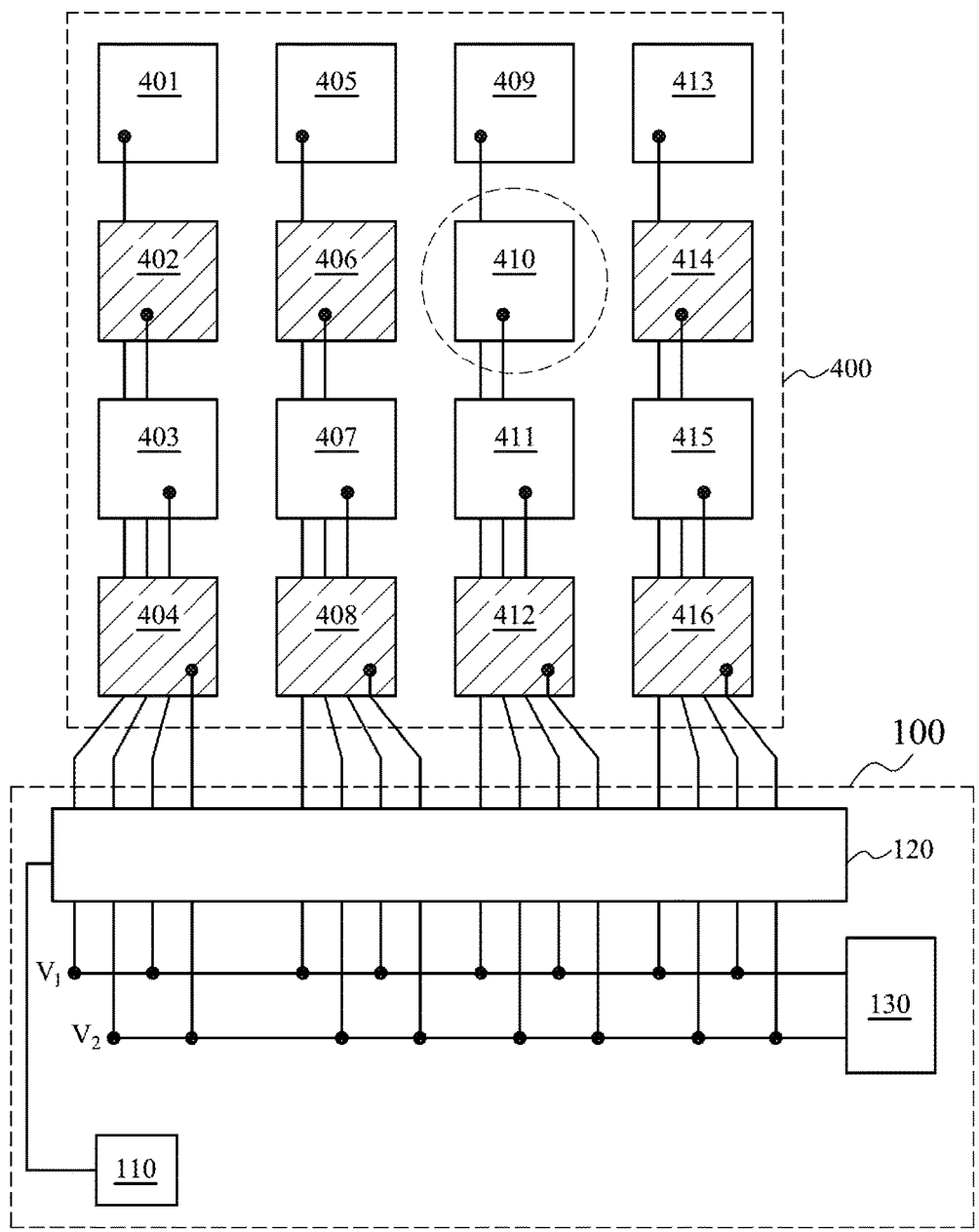

In this situation, there is no short circuit between two vertical-adjacent divided partitions of the touch display panel 400. Step S308 is executed to adjust the control signal CS generated by the control circuit 110 to low-logic level to turn off the switch units in the verification switch circuit 120, then the verification voltages V1 and V2 will not be sent to the divided partitions 401~416 of the touch display panel 400. Another circuit (that is, the working circuit) takes over the control of the divided partitions in step S310. However, in another situation as shown in FIG. 4B, the divided partition 410 on the even row displays at the same brightness with the divided partitions 409 and 411 on the odd rows. It can be observed that there is a short circuit between divided partition 410 and divided partition 409 or 411, and in this situation, the flow will return to step S302 to send the verification voltages V1 and V2 again to confirm the function of the touch display panel.

The above embodiment can be used to confirm whether there is a short circuit between the up and down adjacent divided partitions. Nonetheless, by this method, whether there is a short circuit between divided partitions in odd and even rows or between left and right adjacent divided partitions cannot be validated.

Figure 5A:
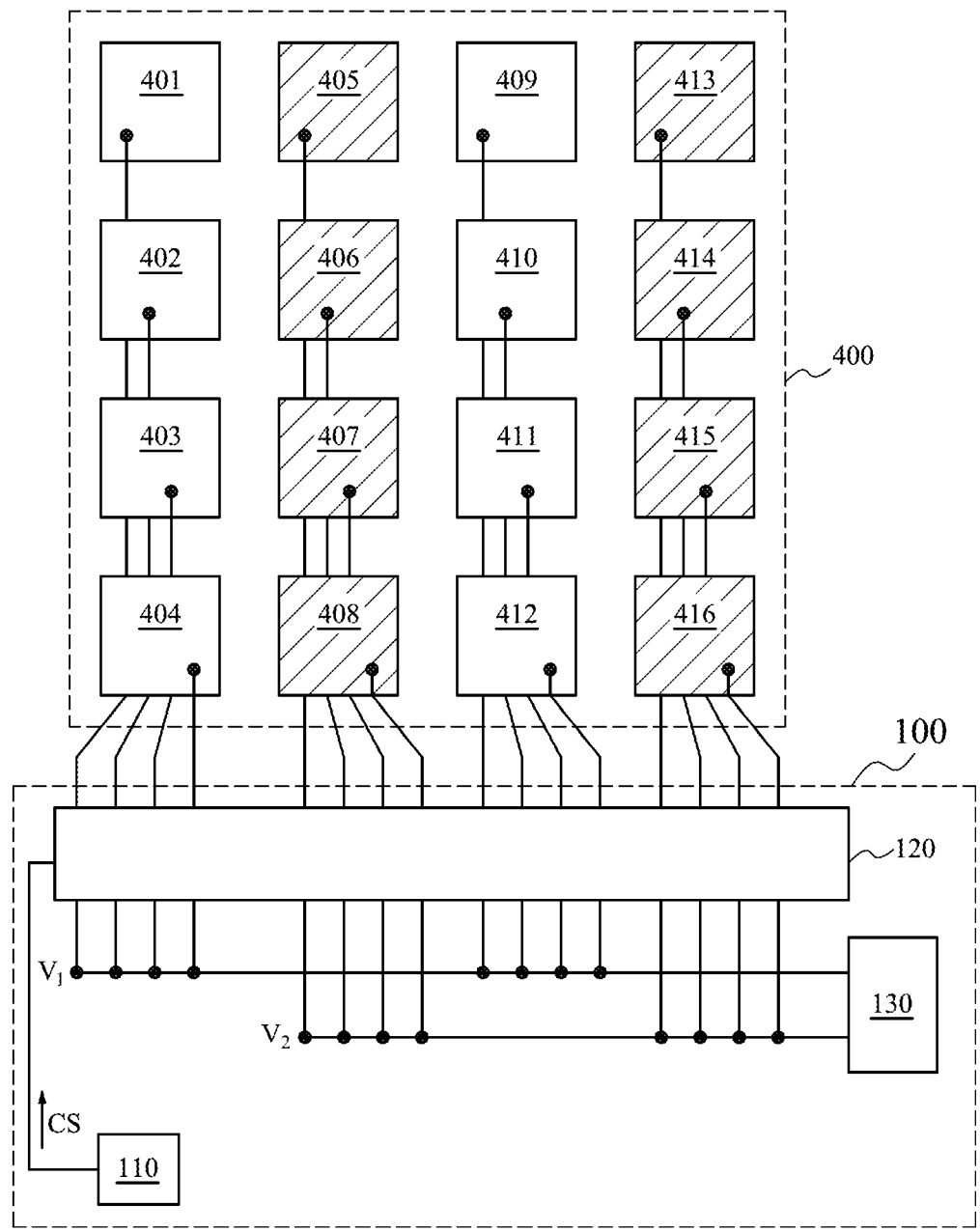

In another embodiment, as shown in FIG. 5A, a touch display panel 400 includes divided partitions 401~416. Divided partitions 401, 402, 403, 404, 409, 410, 411, 412 are arranged on odd columns of the touch display panel 400, and divided partitions 405, 406, 407, 408, 413, 414, 415, 416 are arranged on even columns of the 400.

When the signal generating circuit 130 simultaneously send the verification voltages V1 and V2 respectively to the divided partitions on the odd and even columns. The brightness of the divided partitions on the odd columns are the same, and the brightness of the divided partitions on the even columns are also the same but different from that of the odd columns.

Figure 5B:
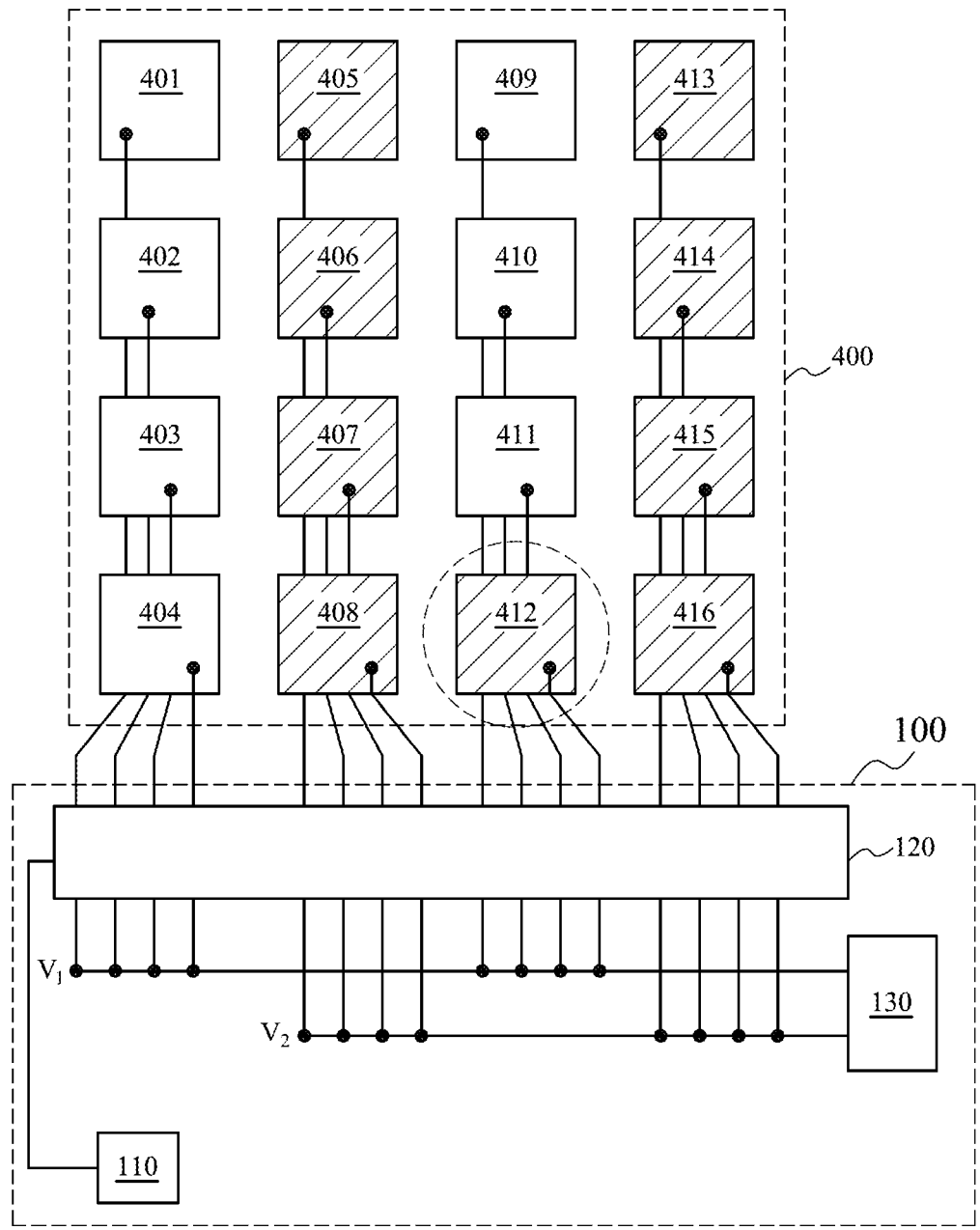

In this situation the left and right adjacent divided partitions of the touch display panel 400 have no short circuit. However, in another situation as shown in FIG. 5B, the divided partition 412 on the even column displays at the same brightness with the divided partitions 408 and 416 on the odd columns. It can be observed that there is a short circuit between divided partition 412 and divided partition 408 or 416.

The above embodiment can be used to confirm whether there is a short circuit between the left and right adjacent divided partitions. Nonetheless, by this method, whether there is a short circuit between divided partitions in odd and even columns or between up and down adjacent divided partitions cannot be validated.

Figure 6A:
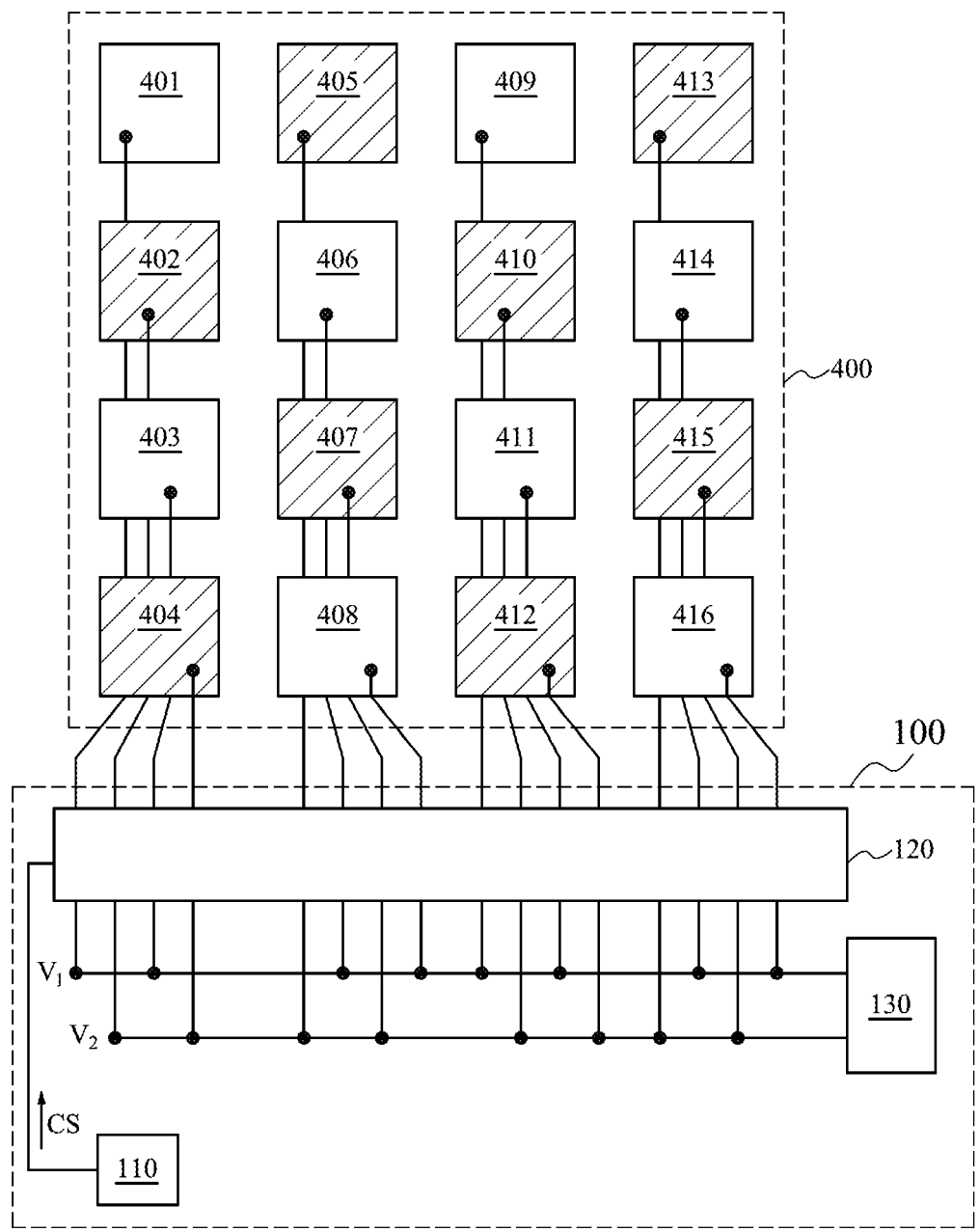

In still another embodiment, as shown in FIG. 6A, a touch display panel 400 includes divided partitions 401~416. Divided partitions 401, 402, 403, 404, 409, 410, 411, 412 are arranged on odd columns of the touch display panel 400, and divided partitions 405, 406, 407, 408, 413, 414, 415, 416 are arranged on even columns of the 400.

Comparing to FIG. 5A and FIG. 5B, in the embodiment shown in FIG. 6A, the signal generating circuit 130 alternately sends the verification voltages to every two adjacent divided partitions on the odd columns via the circuit switch units in the verification switch circuit 120. The so-called alternately sends the verification voltages to every two adjacent divided partitions indicates that, as shown in FIG. 6A, for the divided partitions 401~404 in odd column, send verification voltages V1 and V2 to adjacent divided partitions 401 and 402, and simultaneously send verification voltages V1 and V2 to adjacent divided partitions 403 and 404. Namely, for the divided partitions 405~408 in even column, send verification voltages V2 and V1 to adjacent divided partitions 405 and 406, and simultaneously send verification voltages V2 and V1 to adjacent divided partitions 407 and 408.

At this moment any arbitrary adjacent divided partitions in odd and even columns receive different verification voltage. For example, the divided partition 401 on the odd column and the divided partition 405 on the even column receive verification voltages V1 and V2 respectively. The divided partition 402 on the odd column and the divided partition 406 on the even column receive verification voltages V2 and V1 respectively.

By the same method, alternately send the verification voltages V1 and V2 to the divided partitions 409~412 on the odd column, and alternately send the verification voltages V2 and V1 to the divided partitions 413~415 on the even column.

In this situation, as shown in FIG. 6A, the brightness of an arbitrary divided partition on the odd or even column is different from its neighbors in four directions. If this is true, it can be confirmed that there is no short circuit between the divided partition and its neighbors in four directions.

For instance, the brightness of the divided partition 407 on the even column is different from the brightness of the divided partition 406 (i.e., the partition adjacent to the divided partition 407 on the top side) and the brightness of the divided partition 408 (i.e., the partition adjacent to the divided partition 407 on the bottom side). Moreover, the brightness of the divided partition 407 is different from the brightness of the divided partition 403 (i.e., the partition adjacent to the divided partition 407 on the left side) and the divided partition 411 (i.e., the partition adjacent to the divided partition 407 on the right side). Then there is no short circuit between the divided partition 407 and the divided partitions 406/408/403/411 in the neighborhood along four directions.

For another instance, the brightness of the divided partition 410 on the even column is different from the brightness of the upside/downside adjacent divided partitions 409 and 411. Moreover, the brightness of the divided partition 410 is different from the brightness of the leftside/rightside adjacent divided partitions 406 and 414. Then there is no short circuit between the divided partition 410 and the neighboring divided partitions 409, 411, 406, and 414 in four directions.

Figure 6B:
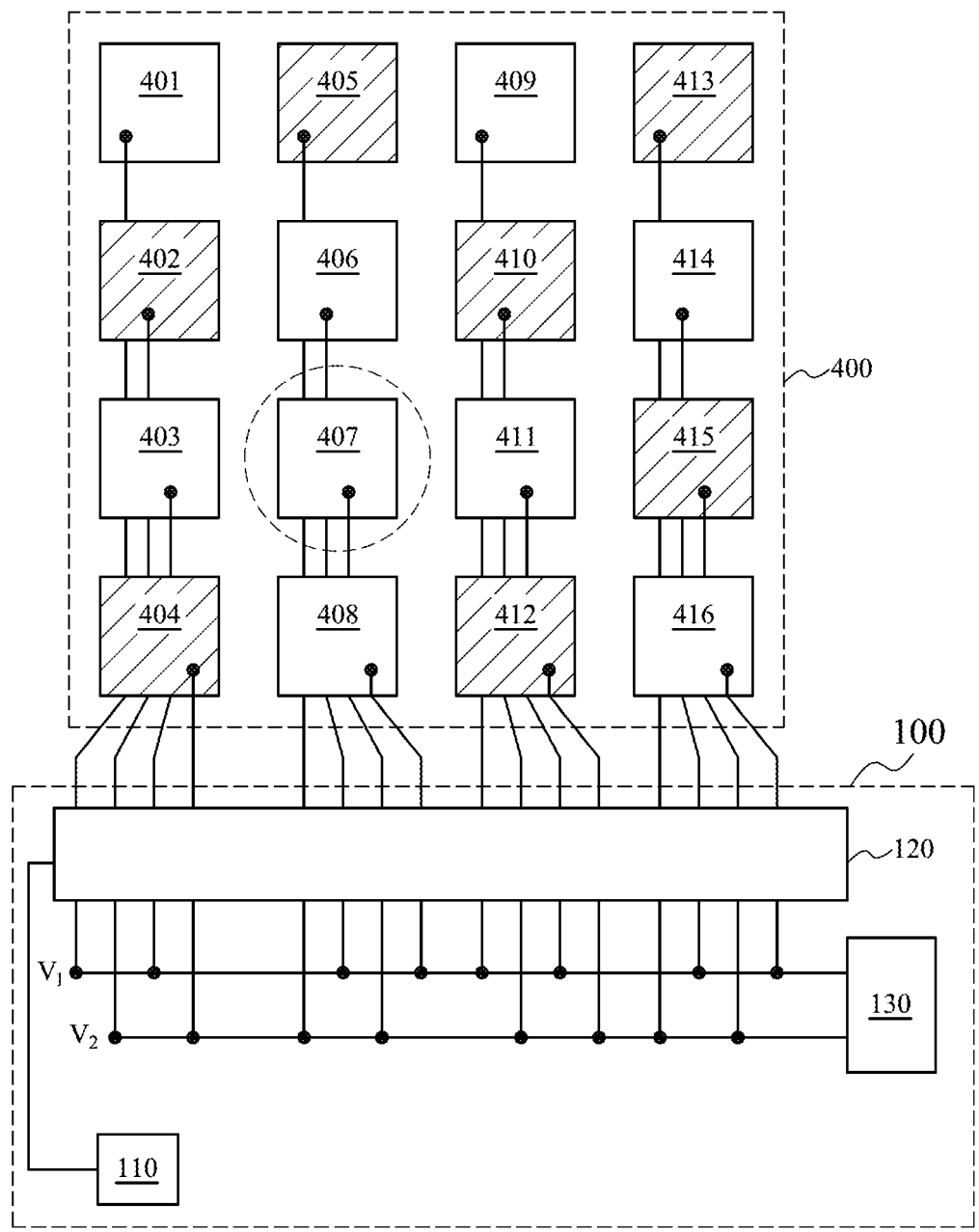

In another situation, as shown in FIG. 6B, the brightness of the divided partition 407 on even column is the same as the divided partitions 403 and 411 on odd column and the divided partitions 406 and 408 on even column. It can be judged that there is a short circuit between the divided partition 407 and one of the divided partitions 403, 406, 408, and 411. Comparing to the embodiments shown in FIG. 4A to FIG. 4B and FIG. 5A to FIG. 5B above, whether there is a short circuit between an arbitrary divided partition and the neighbors in four directions can be verified simultaneously in this embodiment.

When it is confirmed that the touch display panel functions normally and there is no short circuit, as mentioned above, in step S306, the control signal CS generated by the control circuit 110 is adjusted to low-logic level (such as 0). At this moment, the switch units in the verification switch circuit 120 is turned off, and the sending of verification voltages from the signal generating circuit 130 to the divided partitions 401~416 of the touch display panel 400 is stopped. In the following step S208, another circuit (which is the working circuit) will replace the verification apparatus 100, and control the divided partitions 401~416 of the touch display panel 400 separately. The mechanism of how the working circuit controls touch display panel is the same as it is mentioned previously.

Figure 7A:
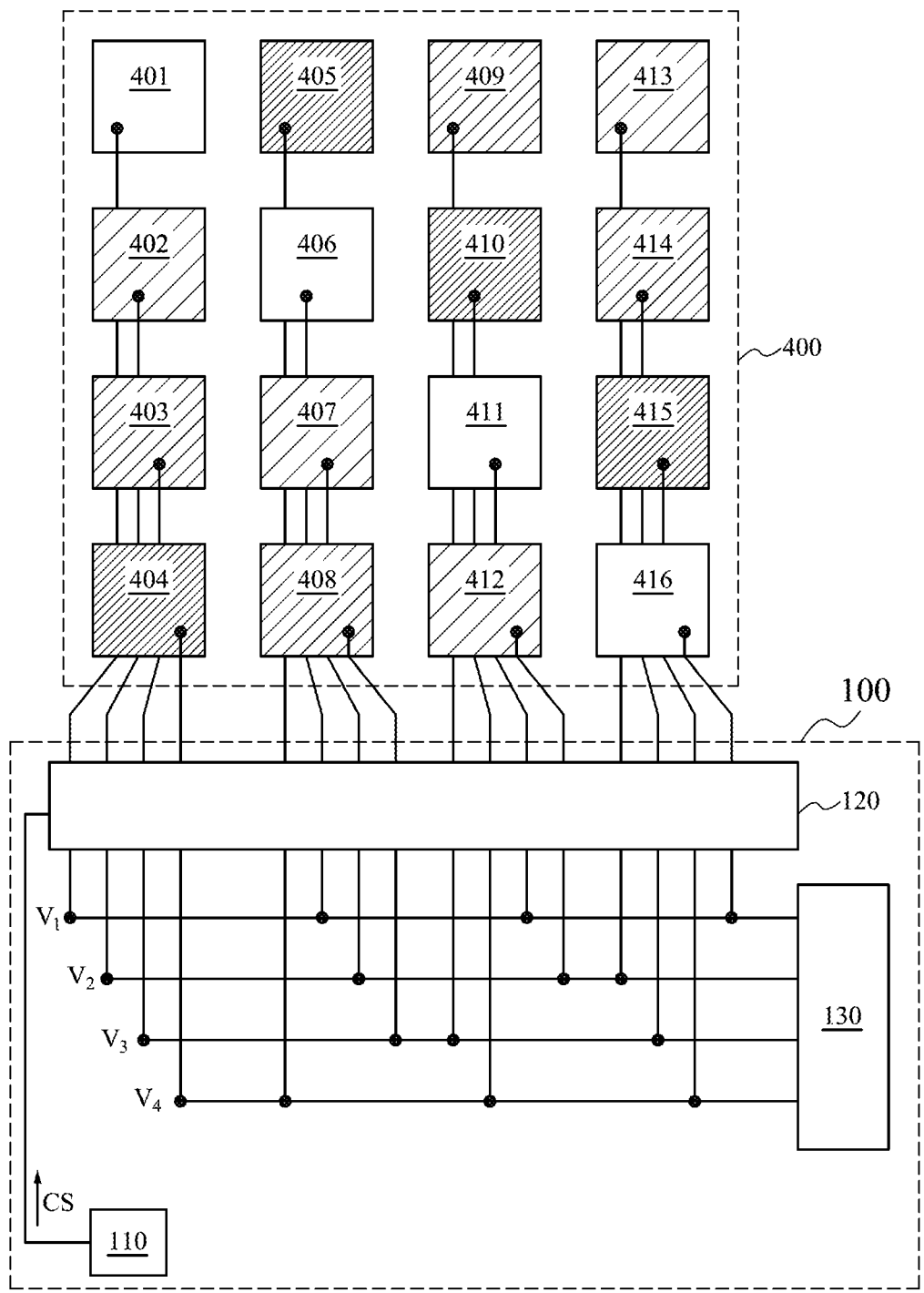

Comparing to the verification voltage V1 and V2 shown in FIG. 6A, there are extra verification voltages V3 and V4 sent in the embodiment shown in FIG. 7A. The signal generating circuit 130 sends verification voltages V1, V2, V3, and V4 via the circuit switch units in the verification switch circuit 120 to four adjacent divided partitions on the odd column. That is, send the verification voltage V1, V2, V3, and V4 to divided partitions 401, 402, 403, and 404. Also, send the verification voltage V4, V1, V2, and V3 to divided partitions 405, 406, 407, and 408. In the same manner, send the verification voltage V3, V4, V1, and V2 to divided partitions 409, 410, 411, and 412. Likewise, send the verification voltage V2, V3, V4, and V1 to divided partitions 413, 414, 415, and 416.

Comparing to FIG. 6A, as shown in FIG. 7A, the same part is that the brightness of an arbitrary divided partition on the odd or even rows is different from the brightness of the neighbors in the four directions. But the unlike part is that when there is a short circuit in any arbitrary divided partition, the location of the short circuit can be found more clearly.

Figure 7B:
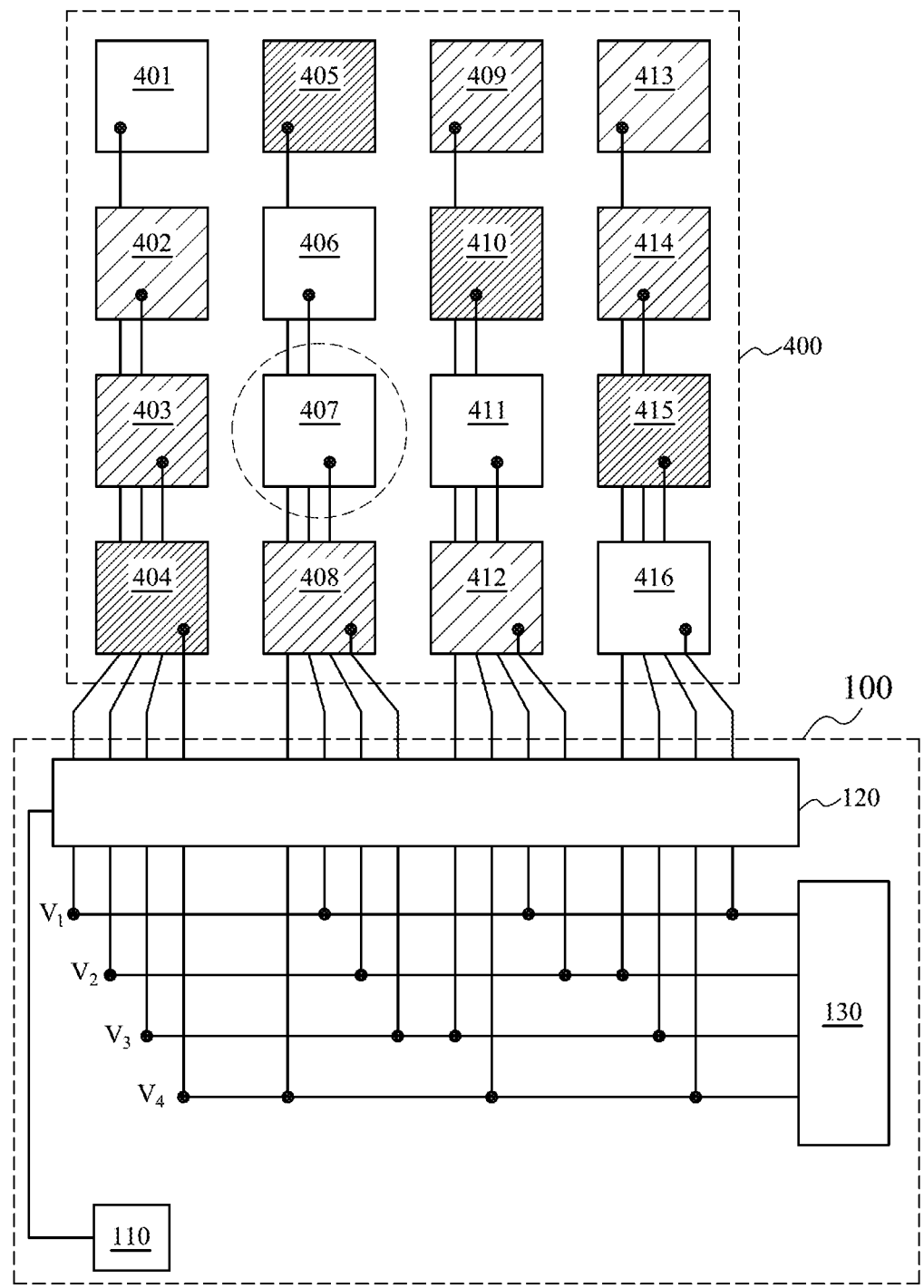

For example, as shown in FIG. 7B, when the divided partition 407, 406, and 411 display at the same brightness, it can be concluded that there is a short circuit between the divided partition 407 and the divided partition 406 or 411. Possibilities in other directions can be excluded.

The abovementioned locations of short circuits shown in FIG. 4B to FIG. 7B only serve as examples for explanation. Practically, short circuits can be found at any arbitrary divided partition on the touch display panel.

Based on the abovementioned contents and embodiments, this disclosure provides a verification apparatus. By using the verification apparatus, light-emitting verification and short circuit verification for the divided partitions of the touch display panel can be conducted.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A verification apparatus, suitable for a touch display panel comprising a plurality of divided partitions, the verification apparatus comprising:
   a signal generating circuit configured to generate a first verification voltage;
   a verification switch circuit comprising a plurality of switch units, the switch units being coupled between the divided partitions and the signal generating circuit, the verification switch circuit being configured to send the first verification voltage simultaneously to at least two of the divided partitions;
   a control circuit configured to generate a control signal for switching the switch units, wherein the switch units are turned on for conducting a verification to send the first verification voltage simultaneously to at least two of the divided partitions in response to the control signal with logic-high level,
   wherein the switch units are turned off and stopped from sending the first verification voltage in response to the control signal with logic-low level for ending the verification,
   wherein after the verification is ended, the verification apparatus will no longer conduct any verification to the touch display panel, and the divided partitions will be controlled by a working circuit.

2. The verification apparatus of claim 1, wherein the signal generating circuit further generates a second verification voltage, the divided partitions are arranged on odd columns or even columns, the switch units simultaneously send the first verification voltage to the divided partitions on the odd columns, the switch units simultaneously send the second verification voltage to the divided partitions on the even columns.

3. The verification apparatus of claim 1, wherein the signal generating circuit further generates a second verification voltage, the divided partitions are arranged on odd rows or even rows, the switch units simultaneously send the first verification voltage to the divided partitions on the odd rows, the switch units simultaneously send the second verification voltage to the divided partitions on the even rows.

4. The verification apparatus of claim 1, wherein the signal generating circuit further generates a second verification voltage, the divided partitions are arranged on odd columns or even columns, the switch units alternatively send the first verification voltage and the second verification voltage to every two adjacent divided partitions on the odd columns, the switch units alternatively send the second verification voltage and the first verification voltage to every two adjacent divided partitions on the even columns.

* * * * *